(12) United States Patent
Bassil

(10) Patent No.: US 8,652,425 B2
(45) Date of Patent: Feb. 18, 2014

(54) INDUSTRIAL EXTRACTION OF URANIUM USING AMMONIUM CARBONATE AND MEMBRANE SEPARATION

(76) Inventor: Andrew Bassil, Strand (ZA)

( * ) Notice: Subject to any disclaimer, the term of this patent is extended or adjusted under 35 U.S.C. 154(b) by 0 days.

(21) Appl. No.: 13/641,708

(22) PCT Filed: Apr. 19, 2011

(86) PCT No.: PCT/IB2011/051683
§ 371 (c)(1),
(2), (4) Date: Oct. 17, 2012

(87) PCT Pub. No.: WO2011/132138
PCT Pub. Date: Oct. 27, 2011

(65) Prior Publication Data
US 2013/0039823 A1      Feb. 14, 2013

(30) Foreign Application Priority Data
Apr. 19, 2010 (ZA) ................................. 2010/02714

(51) Int. Cl.
*C22B 60/00*      (2006.01)
(52) U.S. Cl.
USPC ................... 423/6; 423/7; 423/253; 423/260; 423/261
(58) Field of Classification Search
USPC .................................. 423/6, 7, 253, 260, 261
See application file for complete search history.

(56) References Cited

U.S. PATENT DOCUMENTS

| 4,606,894 A * | 8/1986 | Kunin et al. ...................... 423/7 |
| 2003/0113247 A1 * | 6/2003 | Singh et al. ...................... 423/8 |
| 2010/0028226 A1 | 2/2010 | Bristow et al. |

FOREIGN PATENT DOCUMENTS

NA      2008/0035      7/2009

OTHER PUBLICATIONS

J. G. H. Du Preez, "The Chemistry of Uranium.Part XXVIII. The Development of a Combined Gold and Uranium Leach of a Randfontein Ore.",Uranium Chemistry Research Unit, University of Port Elizabeth, South Africa , Jul. 10, 1980, Hydrometallurgy, 6 (1981)203-218, Elsevier Scientific Publishing Company, Amsterdam.

Australian Examination Report in respect of counterpart application.

* cited by examiner

*Primary Examiner* — Steven Bos
(74) *Attorney, Agent, or Firm* — Hahn & Moodley LLP; Vani Moodley, Esq.

(57) ABSTRACT

This invention relates to the integration of ammonium carbonate leach processes with established acid and alkaline uranium leach processes as multifunctional industrial processes for the extraction, high degree purification and conversion of processed or semi-processed uranium as U3O8, UO2, or most tetra or hexa-valent forms of uranium, and where applicable, for the recovery of uranium from uranium ores, using advanced multiple stage membrane based technologies for the separation and concentration of uranium in solution from heavy metals and lighter elements that may be present in the solution, and the selective leach and precipitation properties of an ammonium carbonate leach.

10 Claims, 6 Drawing Sheets

FIGURE 1a

INDICATIVE EXAMPLE OF MULTIPLE STAGE LEACHANT CONCENTRATION & WATER/UNREACTED REAGENT RECOVERY SYSTEM

INPUT CONCENTRATIONS

LEACH REAGENT 100 gram/litre
LEACHANT 10 gram/litre

INITIAL FLOW ASSUMPTION: 60m³/h

DILUTED CONCENTRATIONS:

LEACH REAGENT 17g/l
LEACHATE 2g/l

FILTRATION SPECTRUM

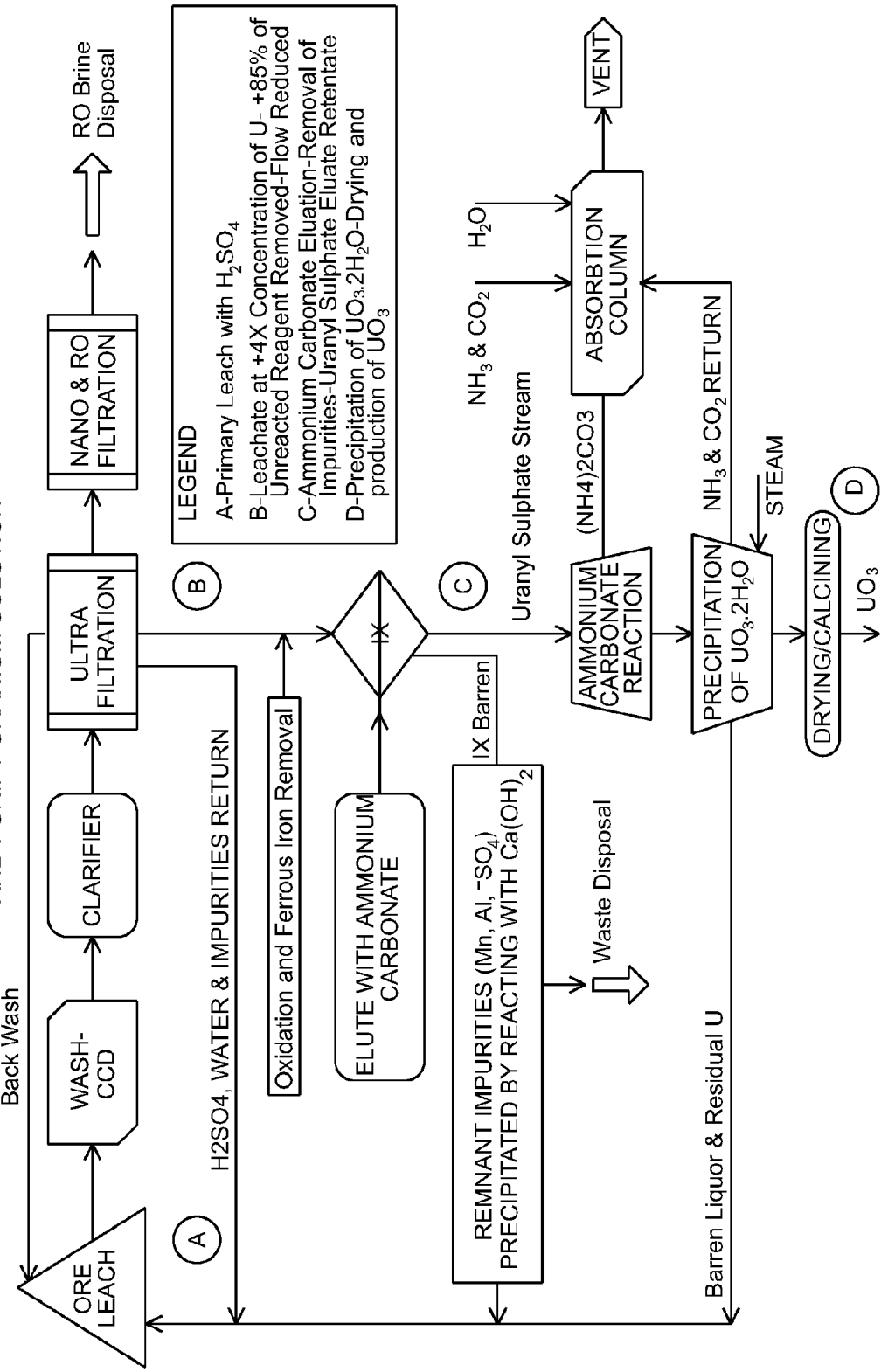
FIGURE 2 SULPHURIC ACID LEACH & PRECIPITAION SEQUENCE USING MEMBRANES & AMMONIUM CARONATE TO RECOVER AND PURIFY URANIUM SOLUTION SODIUM CARBONATE LEACH & PRECIPITATION SEQUENCE USING AMMONIUM CARBONATE IN CONJUNCTION WITH AN IX PROCESS TO RECOVER AND PURIFY URANIUM SOLUTION

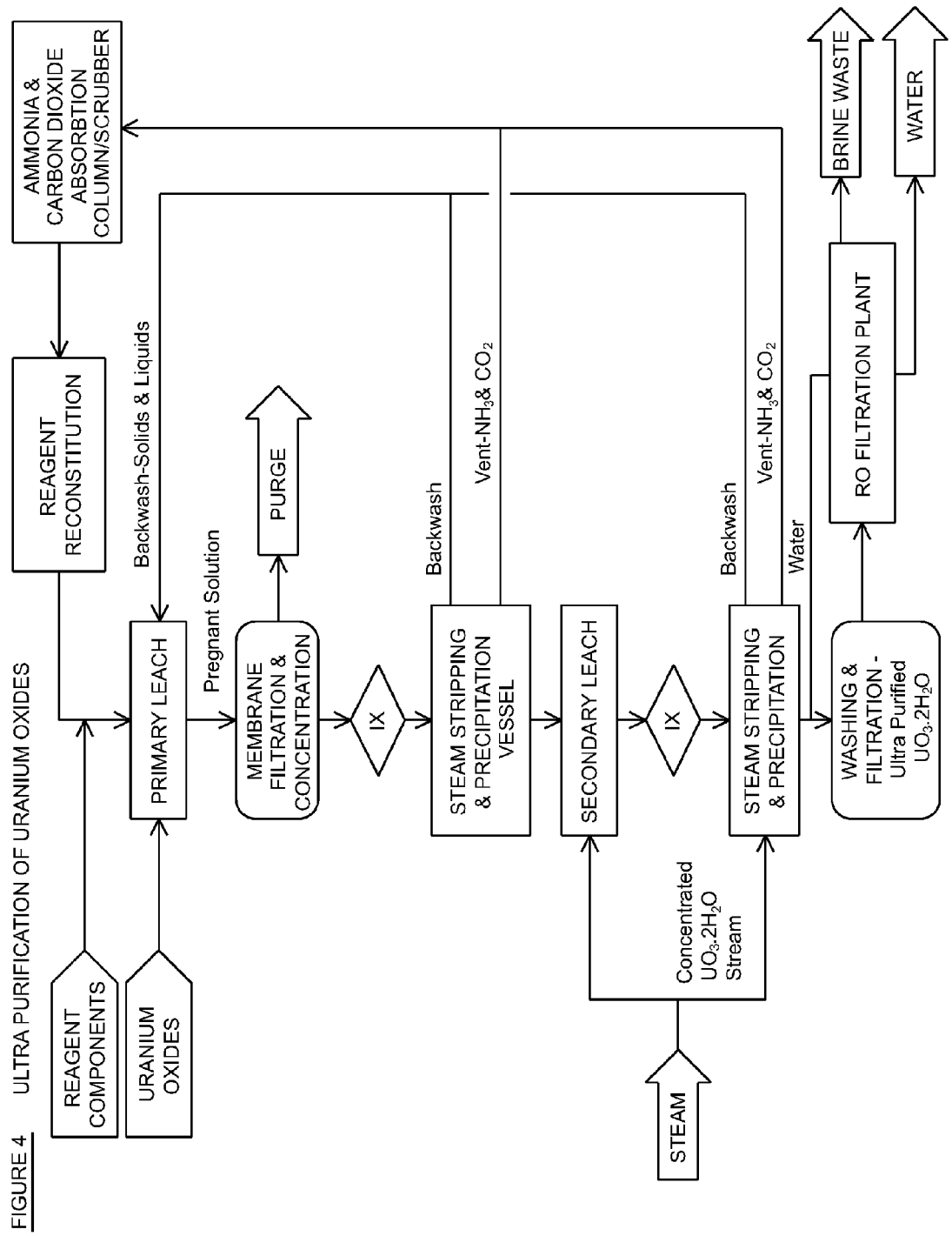
FIGURE 4  ULTRA PURIFICATION OF URANIUM OXIDES

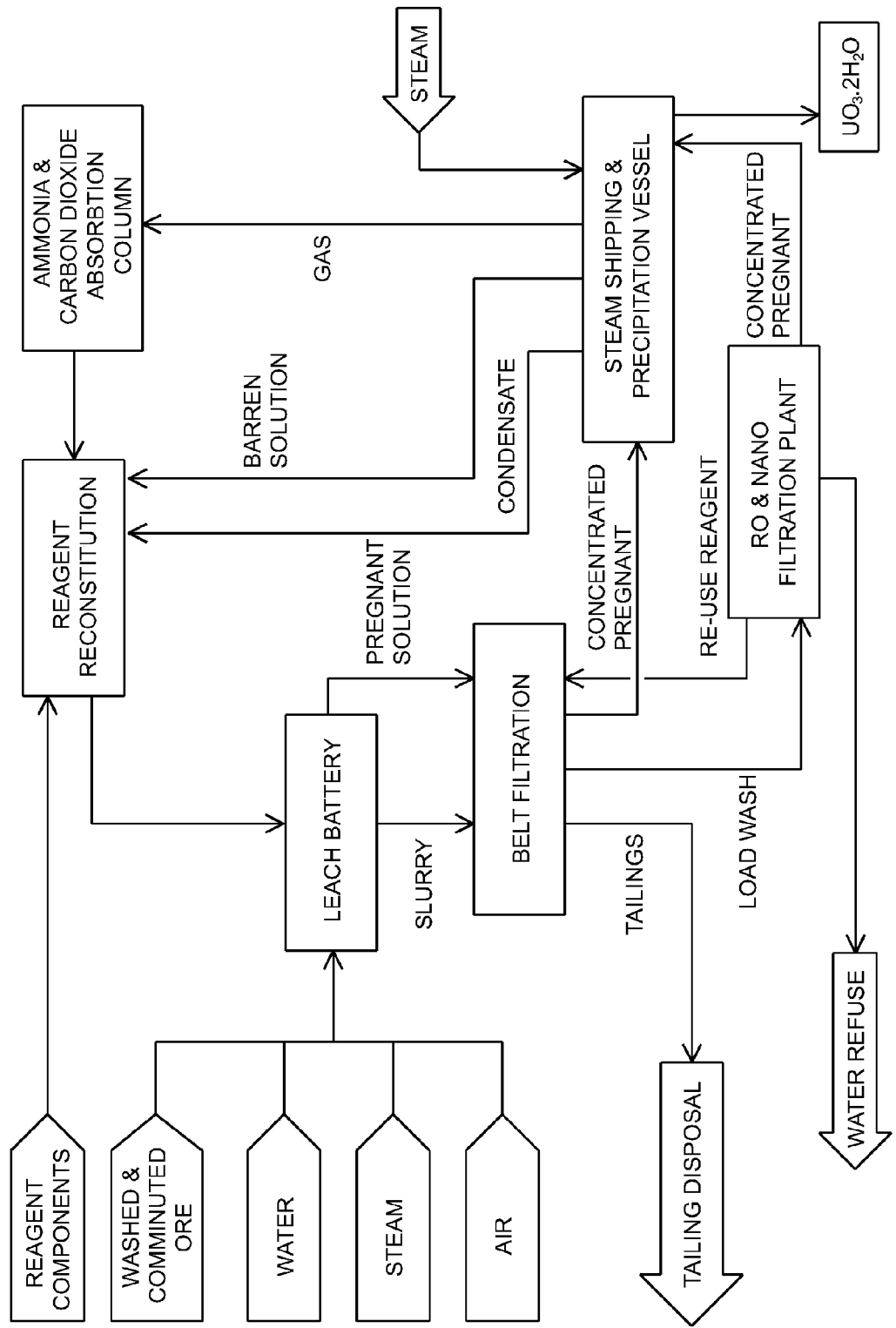

INDUSTRIAL EXTRACTION OF URANIUM USING AMMONIUM CARBONATE AND MEMBRANE SEPARATION

FIELD OF THE INVENTION

This invention relates to industrial processes for extraction, high degree purification and conversion of uranium containing substances.

Unless the context indicated otherwise, in this specification, the term "extraction" in relation to uranium, denotes any process in which a resultant substance is obtained from a source substance, in which the resultant substance has a higher uranium content than the source substance and the term "extraction" is thus used broadly and includes processes such as purification, conversion, and the like.

BACKGROUND TO THE INVENTION

The established processes for the extraction of uranium from ore are sulphuric acid and sodium carbonate leach processes and in a few limited instances, in situ and pressure leaches using ammonium carbonate. The standard recovery of uranium in most of these processes is achieved through the processing of the uranium leachate using ion and solvent extraction to produce ammonium di-uranate (ADU), followed by a calcining process for the production of pure (above 95%) yellow cake (uranium oxide mixture)

The extraction of uranium from ore using ammonium carbonate as a leach reagent has been proposed in U.S. Pat. No. 4,405,567 (Stapp), but this process did not find industrial acceptance because the technologies to apply it efficiently on an industrial basis were not available.

The known processes for the recovery of uranium that could be applied to an ammonium carbonate pregnant solution include steam stripping, ion exchange and solvent exchange, but none of these processes, alone or in combination, can provide the desired efficiency in recovering uranium.

A method for the removal of uranium from an aqueous phosphoric acid solution is also described in U.S. Pat. No. 4,206,049 (Stana et al), which comprises passing the uranium containing solution through a reverse osmosis membrane to concentrate the uranium and then concentrating the uranium further by flushing it with water and passing it through a further reverse osmosis membrane. This method has not been accepted for the industrial recovery of uranium from leached solutions, primarily because of inefficiencies in the process and not allowing for the recovery of unused reagents.

The present invention seeks to provide for industrial extraction of uranium that is energy and capital efficient, that allows for the recovery of a high percentage of water and leach reagents, and which provides for the efficient precipitation of uranium with a high degree of purity.

The invention furthermore seeks to achieve precipitation of uranium at a high degree of efficiency and purity, attaining this by minimising the use of the ion exchange process and eliminating the generally accepted solvent extraction process.

SUMMARY OF THE INVENTION

This invention relates to the integration of ammonium carbonate leach processes with established acid and alkaline uranium leach processes as multifunctional industrial processes for the extraction, high degree purification and conversion of processed or semi-processed uranium as $UO_3$ $UO_2$, or most tetra or hexa-valent forms of uranium, and where applicable, for the recovery of uranium from uranium ores, using advanced multiple stage membrane based technologies for the separation and concentration of uranium in solution from heavy metals and lighter elements that may be present in the solution, and the selective leach and precipitation properties of an ammonium carbonate leach.

According to a first aspect of the present invention there is provided a process for extracting uranium as $U_3O_8$, $UO_3$, $UO_2$, or most tetra or hexa-valent forms of uranium, from a uranium containing composition such as processed or semi-processed uranium, said process comprising:

exposing the uranium containing composition to a primary leach reagent and allowing the uranium to be leached from the uranium containing composition to combine with the primary leach reagent and form a leachate; and precipitating the uranium from the leachate solution;

said process including the steps of exposing the uranium to ammonium carbonate and processing the leachate by membrane separation, but the exposure to ammonium carbonate and the processing by membrane separation can occurring in any sequence and the process or any of its steps may be repeated.

In this specification, unless the context indicates otherwise, the term "uranium containing composition" refers to the initial substance to which the process is applied, but also refers to the various intermediate forms of the substance/composition during the process and accordingly, the step of exposing the uranium containing composition to ammonium carbonate refers to exposure of the initial substance to ammonium carbonate (e.g. leaching the substance with ammonium carbonate as primary leach reagent) or exposing a subsequent/intermediate form of the substance (e.g. leachate or eluate) to ammonium carbonate.

Unless the context indicates otherwise, the term "membrane separation" refers to any separation process in which a liquid is exposed to a membrane under pressure and some of the constituents of the liquid are allowed to pass through the membrane, while others are not. The term "membrane separation" thus includes the processes of reverse osmosis, nano filtration and ultra filtration.

The method may include:
exposing uranium ore to a primary leach reagent such as an acid or alkaline leach reagent and allowing the uranium to be leached from the uranium ore to combine with the primary leach reagent and form a leachate:

concentrating and preferably purifying the leachate by multi-stage membrane separation to form a concentrated leach solution;

recovering un-reacted primary leach reagent and water from the leachate during said membrane separation;

exposing said concentrated leachate to ammonium carbonate to form a solution; and precipitating uranium in the form of $UO_3.2H_2O$ from said solution, e.g. by exposure to steam.

The primary leach reagent may include a sulphuric acid solution and, depending on the ore composition, the process may include raising the pH, to precipitate ferric and ferrous impurities prior to exposing the leachate to ammonium carbonate and subjecting the retentate to heat to precipitate uranium as UO3.2H2O.

Alternatively, the primary leach reagent may include a sodium carbonate (e.g. sodium carbonate or sodium bicarbonate) solution, and the process may include concentrating the leachate by membrane separation, and exposing the resultant sodium-di-uranate precipitate to an ammonium carbonate solution and heat for the precipitation of uranium in the form of $UO_3 \cdot 2H_2O$, which may be recovered by filtration, and drying the precipitate to produce $UO_3$.

Irrespective of the choice of primary leach reagent, the process may include the step of calcining uranium in the form of $UO_3 \cdot 2H_2O$ after exposure to ammonium carbonate to produce UO3. The process may include recovering water from the leachate by membrane separation and may include recovering leach reagents from the retentate of the membrane separation, in further membrane separation.

The process may include removing impurities from the concentrated leachate by ion exchange (IX) to produce an IX barren and uranyl eluate prior to exposing said concentrated leachate to ammonium carbonate.

The step of concentrating the leachate by multi-stage membrane separation may include subjecting the leachate to ultra and nano filtration to provide the concentrated leachate in the form of a filtrate, and subjecting the permeate from the nano filtration to reverse osmosis to recover un-reacted leach reagent in the retentate and recover water in the permeate.

The invention extends to embodiments where the primary leach reagent may include ammonium carbonate, followed by the application of the processed described above.

The invention extends further to the ultra purification of uranium containing compositions in the form of uranium oxides and the primary leach reagent may be ammonium carbonate—followed by the processes described hereinabove.

BRIEF DESCRIPTION OF THE DRAWINGS

For a better understanding of the present invention, and to show how the same may be carried into effect, the invention will now be described by way of non-limiting example, with reference to the accompanying drawings in which:

FIG. 1(a) is a process diagram of a multi-stage leachant concentration process that can be included in embodiments of the present invention;

FIG. 2 is a process diagram of a first embodiment of the present invention in sulphuric acid leach processes, and a second embodiment of the present invention that is similar to the embodiment shown in FIG. 2, but in which the step of ion exchange has been greatly reduced;

FIG. 4 is a process diagram of a fifth embodiment of the present invention in an ammonium carbonate leach process to produce ultra pure uranium oxides; and FIG. 5 is a process diagram of a sixth embodiment of the present invention in an ammonium carbonate leach process for the extraction of uranium from uranium bearing ore.

DETAILED DESCRIPTION OF THE DRAWINGS

Figure 1B:
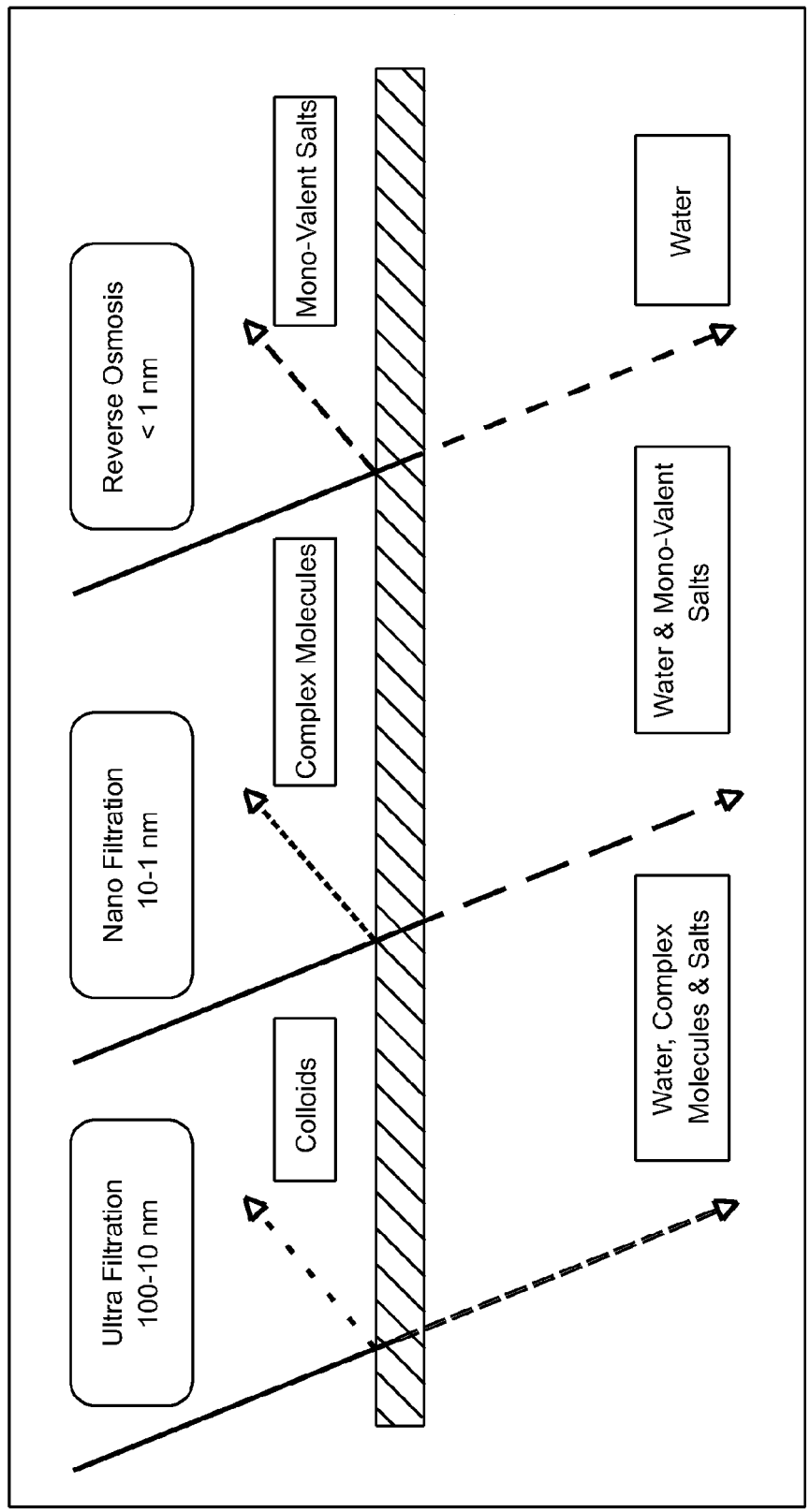
FIG. 1(b) is a diagram detailing the filtration properties of the various types of membranes.

Referring to FIG. 1(a):

A multi-stage leachant concentration process according to the invention can be included in alkaline and acid leach embodiments of the present invention that are described below, to concentrate and purify the leachant. In addition to being only a non-limiting example, the quantities shown in FIG. 1(a) are indicative of what could theoretically be achieved, and need to be ratified and/or adjusted for each application of the process.

In the process shown in FIG. 1(a), the leachate, which includes leachant, or eluate (which is a form of uranium in the present invention, but could also be something else) and leach reagent (which is sulphuric acid, sodium carbonate or ammonium carbonate, in the embodiments of the present invention described below), is diluted with water before being concentrated and purified as a first stage of the process.

In the first stage, the diluted leachate or eluate is subjected to membrane separation in the form of nano filtration and the filtrate, which includes practically all of the leachant, is fed to the second stage of the process (see below). The leachant concentration in the filtrate is much higher and the leach reagent concentration is much lower than in the leachate fed to the first stage. Permeate from the nano filtration includes most of the leach reagent in a diluted solution and is subjected to membrane separation in the form of reverse osmosis (RO) and permeate from the RO, which includes practically pure water, is re-circulated to the supply of water used to dilute the leachate at the supply to the first stage of the process. The retentate from the RO includes practically all the leach reagent that remained in permeate from the nano filtration, but is much more concentrated (after removal of water in the reverse osmosis) and is re-used in further leaching.

As mentioned above, filtrate from the nano filtration in the first stage of the process includes leachant and leach reagent and is fed to a second stage of the process—in a second stage supply stream. In the second stage of the process, similarly to the first stage, the second stage supply stream is diluted with water and is subjected to nano filtration and permeate from the nano filtration is subjected to RO to provide water permeate that is re-circulated for dilution of the second stage supply stream. Further, like in the first stage, retentate from the RO in the second stage, is an aqueous solution of leach reagent that is re-used in the leach process and the filtrate from the second stage nano filtration is a much more concentrated and purer solution of leachant than the second stage supply stream.

The illustrated example of the process in FIG. 1(a) includes only two stages of membrane separation, each stage including nano filtration and RO and each stage providing a more concentrated and purer solution of leachant that is available for a further stage or further processing, and each stage recovering more of the leach reagent. Each stage of membrane separation thus allows for the concentration and partial purification of a leachate stream from either acid or alkaline leaches.

Although this figure indicates a two stage nano filtration and RO process, this may be extended to allow for the inclusion of ultra filtration and more stages. The concentration process illustrated in FIG. 1(a) is an improvement over the Stana et al process in that it allows for the recovery of part of the leach reagent at low capital and energy expenditure, whereas the Stana process does not separate un-reacted reagent. Further, since a significant percentage of water is recovered in the RO units, this process serves as an excellent facility to concentrate the leachant in the uranium recovery process.

Concentration factors between the concentration of uranium in the leachate supplied to the plant and the uranium concentrate leaving the plant are feed dependent, but are typically in the order of up to 30 times for uranium and for the un-reacted reagent, a recovery of up to 80% can be realised.

Referring to FIG. 1(b):

Properties of the three types of membrane separation to which reference is made in this application, are shown.

Referring to FIG. 2:

In each of the first and second embodiments of the present invention, a uranium containing composition in the form of uranium bearing ore, is leached with a sulphuric acid ($H_2SO_4$)

leach reagent in a heap, tank or autoclave leaching process and the leachate is concentrated through single or preferably multi-stage nano filtration and reverse osmosis as described above (and as illustrated in FIG. 1(a)). This concentration process allows for the recovery of sulphuric acid and water and the removal of impurities, which are returned to the leaching process, and also eliminates the need for controlling reagent feed to the leach process.

In the first embodiment (shown in FIG. 2), the concentrate flowing from the final nano filtration stage is streamed to an ion exchange (IX) column process. Ferric and ferrous impurities can be removed prior to the IX process or depending on the properties of the IX process, after the process from the IX barren. High efficiencies of the membranes and the IX process results in a significant flow reduction to the IX plant and an increase in the purity of the IX eluate.

The first embodiment of the invention using membrane processing prior to the IX process is the preferred process, and may be followed by raising the pH to 2.5 for the precipitation of ferric and ferrous impurities, prior to the IX process. This is necessary as ferric ions are readily absorbed on the IX column at this pH. It is envisaged that subject to an increase in the efficiencies of the primary membranes, the ion exchange step may be eliminated or reduced in a process in accordance with the second embodiment of the invention (shown in FIG. 2).

The barren from the IX process is further subjected to a $Ca(OH)_2$ reaction for the purging and precipitation of non ferrous impurities, before being returned to the primary leach process.

The resin is loaded with U, and impurities stripped out (in the form of the IX barren in the first embodiment), and the eluate containing the U from the loaded resin (in the first embodiment of the invention) is reacted with ammonium carbonate $(NH_4)_2CO_3$ as shown below:

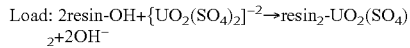

Load: $2resin\text{-}OH + \{UO_2(SO_4)_2\}^{-2} \rightarrow resin_2\text{-}UO_2(SO_4)_2 + 2OH^-$

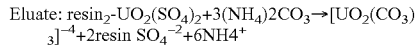

Eluate: $resin_2\text{-}UO_2(SO_4)_2 + 3(NH_4)_2CO_3 \rightarrow [UO_2(CO_3)_3]^{-4} + 2resin\ SO_4^{-2} + 6NH_4^+$ This is followed by applying heat to the eluate and precipitation of $UO_3.2H_2O$ which is optimally achieved by removing excess ammonia ($NH_3$) and carbon dioxide ($CO_2$) through the introduction of steam in a precipitation vessel:

$(NH_4)4UO_2(CO_3)_3 + heat \rightarrow UO_32H_2O + 4NH_3 + 3CO_2$

Precipitation occurs readily as the resultant concentrate is at this stage at a critical level, where the minimum application of steam will result in uranium precipitation.

$UO_3.2H_2O$ is removed through a filtration or cyclone process and is dried and calcined to produce a final high purity uranium oxide.

Figure 3:
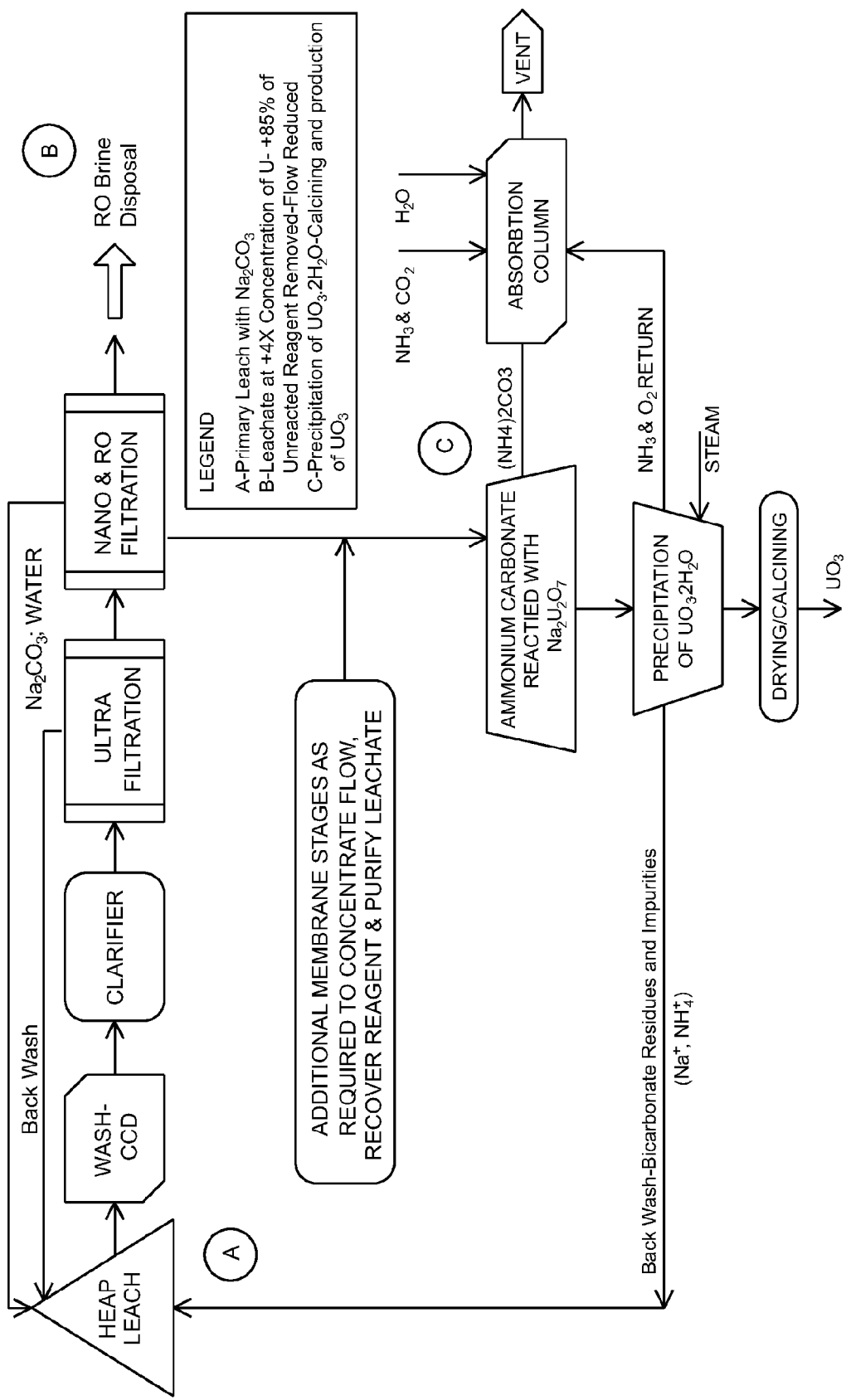
FIG. 3 is a process diagram of a third embodiment of the present invention in a sodium carbonate leach process, and a fourth embodiment of the present invention that is similar to the embodiment shown in FIG. 3, but in which the step of ion exchange has been eliminated.

Referring to FIG. 3:

In each of the third and fourth embodiments of the present invention, a uranium containing composition in the form of uranium bearing ore, is leached with a sodium carbonate (typically with sodium carbonate ($Na_2CO_3$) or sodium bicarbonate ($NaHCO_3$)) leach reagent in a heap or tank leaching process resulting in a leachate containing a leachant in the form of uranyl tricarbonate in solution and this is concentrated through single or preferably multi-stage membrane filtration processes as described above (and as illustrated in FIG. 1(a)). This concentration process allows for the recovery of un-reacted sodium carbonate or bicarbonate leach reagent and water and the removal of mono-valent ions and impurities, which are returned to the leaching process in a return stream. This process allows for excess sodium carbonate to be applied to the leach without undue economic penalty.

The sodium di-uranate solution from the nano filtration and RO is reacted directly with ammonium carbonate, in terms of the fourth embodiment of the invention—essentially the same route as that of the second embodiment. In the fourth embodiment of the invention the selectivity of the ammonium carbonate uranyl eliminates the necessity for an IX process.

In both the third and fourth embodiments of the invention, the sodium di-uranate ($Na_2U_2O_7$) is reacted with ammonium carbonate in solution resulting in the formation of $UO_3.2H_2O$ and ammonia ($NH_3$) and oxygen ($O_2$).

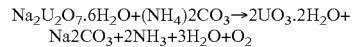

$Na_2U_2O_7.6H_2O + (NH_4)2CO_3 \rightarrow 2UO_3.2H_2O + Na_2CO_3 + 2NH_3 + 3H_2O + O_2$ The products of the reaction are filtered and flowed to a precipitation tank where the $UO_3.2H_2O$ is precipitated through the addition of steam and dried to produce $UO_3$, substantially as described above (with reference to the acid leach process illustrated in FIG. 2).

The released ammonia and oxygen are vented from the precipitation tank where the ammonia is re-combined in an absorption column with carbon dioxide ($CO_2$), to produce ammonium carbonate for the reaction with the precipitated sodium di-uranate. Sodium carbonate is returned into the leach process.

The precipitated $UO_3.2H_2O$ is recovered using filtration or cyclone separation. The main difference between the third and fourth embodiments of the invention (FIG. 3) is the efficiency of the initial membrane separation to remove attendant impurities and the need for an ion exchange process to complete the removal of such impurities to produce a final product at the required level of purity.

Referring to FIGS. 2 to 3, the RO and nano filtration processes of these embodiments of the present invention are essentially similar in all these cases and although chemical flows are indicated, these are merely by way of example and will differ significantly according to the initial leachate constituents.

The feed to the nano filter units is supplied by high pressure pumps, which is then further streamed and pumped to multi-pass RO units. Permeate water is extracted from the solution in the RO units and is returned to the process as a feed stream.

The layout of nano, ultra and RO filtration as shown in FIG. 1(a) are of a generalised nature to confirm design principles and need to be adapted according to the chemical and physical properties of the leachant originating from the primary leach process.

Referring to FIGS. 4 and 5:

In the case of an ammonium carbonate primary leach, the same principles in accordance with this invention are applicable for the very high level of purification of uranium oxides as may be required in the production of $UF_6$. Processed uranium oxide is reacted with ammonium carbonate in a primary leach and the leachate is subjected to a number of nano, ultra and reverse osmosis filtration stages. Final processing may include the use of centrifuges and/or filters to produce a very pure (<200ppm impurities) uranium oxide. In FIG. 4 two stages are indicated, but this could be increased according to the level of purity desired.

The same principles may also be applied for the primary leaching of uranium ore with ammonium carbonate. Whereas this is practically possible, it is only applicable in very specific circumstances, as an ammonium carbonate ore leach is limited by inferior leach kinetics, and it has been found that until such time as this can be overcome, the economics of the acid leach will be more favourable. Following from extensive work on the leaching of uranium ore with ammonium carbonate, a process for the application of ammonium carbonate to the leaching of uranium ore is shown in FIG. 5. The same process principles described in the preceding ammonium carbonate leach applications are utilised in this instance, and a detailed analysis of the various stages of this flow sheet will be apparent to persons skilled in the art of uranium processing.

The leachate is concentrated using multiple stage membrane technologies which in turn is subjected to heat for the precipitation of $UO_3.2H_2O$, the recovery of the leach reagent, and the production of $UO3$.

The chemistry behind the use of ammonium carbonate is similar to the sodium carbonate/bicarbonate process, except that ammonium bicarbonate is not needed, since ammonium hydroxide is produced in the resultant reaction:

Uranium is precipitated as $UO_3.2H_2O$ through the application of heat in the form of steam to the pregnant solution.

This is also applicable in the production of very high purity $UO_3$ for use in the production $UF_6$ (uranium hexafluoride).

The water recovered in all of the above processes may be used for diluting the reagents recovered and re-applied in the leach process along with reagents recovered in the nano and ultra filtration processes.

For the above two processes an oxidant may not required, but a catalyst such as copper sulphate may be added to the ammonium carbonate leach reagent.

The above processes hold a number of advantages over existing uranium recovery processes. In particular, these are multi-functional industrial applications of the ammonium carbonate leaching process for treating processed uranium, which provides industrially feasible processes for the concentration and purification of uranium leachate and a possible third option, for the extraction of uranium, in specialised applications, from uranium bearing ores. These processes result in the production of a high purity uranium precipitate ($UO_3.2H_2O$), without the need to resort to the presently accepted procedure of solvent extraction. It achieves a significant increase (typically up to thirty fold) in the concentration of pregnant solutions with a resultant decrease in energy and capital requirements through the integration of membrane filtration and steam stripping. It allows for the use of excess leaching reagent with a high percentage recovery of unreacted reagent, enhancing the speed and efficiency of the leach. It introduces technology that greatly enhances the process of recovering uranium from leachates and eluates, and allows for rapid recovery of uranium, and consequential capital and energy savings. It combines the water and un-reacted reagent recovery properties of reverse osmosis and nano filtration to concentrate uranium solutions, and the selective leach and precipitation properties of an ammonium carbonate leach for the recovery of high purity uranium.

The invention claimed is:

1. A process for extracting uranium from a uranium containing composition, said process comprising:
    leaching the uranium from the uranium containing composition with sulphuric acid as primary leach reagent, to form a leachate in an aqueous phase;
    concentrating the leachate by membrane separation to form a concentrated leach solution;
    processing the concentrated leach solution in an ion exchange resin so that uranium becomes loaded onto the resin;
    eluting the uranium loaded onto the resin with ammonium carbonate to form an ammonium carbonate eluate; and
    heating the eluate to effect a reduction in pH and precipitation of uranium in the form of $UO_3.2H_2O$.

2. A process according to claim 1, which includes recovering 80 to 85%, by weight, of un-reacted primary leach reagent from the aqueous phase in the step of concentrating the leachate by membrane separation.

3. A process according to claim 1 or claim 2, in which the step of concentrating the leachate by membrane separation includes subjecting the leachate to ultra and nano filtration to provide the concentrated leach solution in the form of a filtrate, and subjecting a permeate from the nano filtration to reverse osmosis to recover un-reacted leach reagent in a retentate of said reverse osmosis and recover water in a permeate of the reverse osmosis.

4. A process according to claim 1 or claim 2, which includes the steps of removing the precipitated $UO_3.2H_2O$ from the eluate, drying the $UO_3.2H_2O$ and calcining the dried $UO_3.2H_2O$.

5. A process according to claim 3, which includes the steps of removing the precipitated $UO_3.2H_2O$ from the eluate, drying the $UO_3.2H_2O$ and calcining the dried $UO_3.2H_2O$.

6. A process according to claim 1 or claim 2, which includes the step of raising the pH of the concentrated leach solution prior to processing it in the ion exchange resin.

7. A process for purification of processed uranium oxide, said process comprising:
    reacting the processed uranium oxide with ammonium carbonate as primary leach reagent, to form a leachate in an aqueous phase;
    concentrating the leachate by membrane separation to form a concentrated leach solution;
    removing impurities from the concentrated leach solution in an ion exchange process; and
    heating the ion exchanged concentrated leach solution to precipitate uranium in the form of $UO_3.2H_2O$.

8. A process according to claim 7, which includes the steps of reacting the precipitated $UO_3.2H_2O$ with ammonium carbonate to form a subsequent leachate, removing impurities from the subsequent leachate in an ion exchange process, and heating the ion exchanged subsequent leachate to precipitate uranium in the form of $UO_3.2H_2O$.

9. A process according to claim 8, which includes multiple repetitions of reacting precipitated $UO_3.2H_2O$ with ammonium carbonate to form a subsequent leachate, removing impurities from the subsequent leachate in an ion exchange process, and heating the ion exchanged subsequent leachate to precipitate uranium in the form of $UO_3.2H_2O$.

10. A process according to any one of claims 7 to 9, which includes recovering $NH_3$ and $CO_2$ that is vented when applying heat, recovering water from the membrane separation, combining the recovered $NH_3$ and $CO_2$ with the recovered water to form an aqueous ammonium carbonate solution, and using the ammonium carbonate solution as leach reagent.

* * * * *